United States Patent
Araki et al.

(10) Patent No.: US 8,473,704 B2
(45) Date of Patent: Jun. 25, 2013

(54) STORAGE DEVICE AND METHOD OF CONTROLLING STORAGE SYSTEM

(75) Inventors: Akihiko Araki, Yokohama (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 496 days.

(21) Appl. No.: 12/742,262

(22) PCT Filed: Apr. 28, 2010

(86) PCT No.: PCT/JP2010/003036
§ 371 (c)(1),
(2), (4) Date: May 11, 2010

(87) PCT Pub. No.: WO2011/135622
PCT Pub. Date: Nov. 3, 2011

(65) Prior Publication Data
US 2012/0131271 A1  May 24, 2012

(51) Int. Cl.
*G06F 12/02* (2006.01)
*G06F 13/18* (2006.01)

(52) U.S. Cl.
USPC ............................ 711/166; 711/158; 711/170

(58) Field of Classification Search
None
See application file for complete search history.

(56) References Cited

U.S. PATENT DOCUMENTS

| | | | |
|---|---|---|---|
| 6,697,881 B2* | 2/2004 | Cochran | 710/5 |
| 7,383,404 B2* | 6/2008 | Barnes et al. | 711/158 |
| 7,424,582 B2* | 9/2008 | Takayama et al. | 711/162 |
| 7,836,247 B2* | 11/2010 | Forrer et al. | 711/112 |
| 2003/0018851 A1 | 1/2003 | Ikeuchi et al. | |
| 2003/0018864 A1 | 1/2003 | Ikeuchi et al. | |
| 2004/0221102 A1 | 11/2004 | Watanabe | |
| 2005/0022187 A1 | 1/2005 | Park | |

FOREIGN PATENT DOCUMENTS

| | | |
|---|---|---|
| EP | 1 758 017 A1 | 2/2007 |
| JP | 2003-29934 A | 1/2003 |

* cited by examiner

*Primary Examiner* — Gary Portka
(74) *Attorney, Agent, or Firm* — Mattingly & Malur, PC

(57) ABSTRACT

With respect to a storage system in which quick formatting and sequential formatting can be run concurrently, the time it takes to process an access request from a host is prevented from becoming prolonged even when a normal sequential formatting process is executed with respect to a storage volume which frequently incurs I/O penalties. The storage device measures the load from the host per configurational unit (storage medium) of LUs, and divides the LUs into a group of LUs whose load per storage medium is low, and a group of LUs whose load per storage medium is high. Further, the density per unit of LU capacity of I/O penalties incurred in a storage volume for which quick formatting is being executed is calculated. Sequential formatting is then executed, with priority, with respect to the LUs belonging to the group with low loads and in order of descending density of incurred I/O penalties.

5 Claims, 13 Drawing Sheets

FIG. 4

High-priority group table 130

| Logical unit number 131 | Average load (MB/s) 132 | LU capacity (GB) 133 | Incurred I/O penalty amount (In the last 1 min) 134 | I/O penalty density 135 | Formatting order 136 |
|---|---|---|---|---|---|
| 0 | 100 | 500 | 10 | 0.020 | 2 |
| 1 | 50 | 250 | 12 | 0.048 | 1 |
| 5 | 35 | 500 | 6 | 0.012 | 3 |
| 7 | 20 | 500 | 5 | 0.010 | 4 |
| ... | ... | ... | ... | ... | ... |

FIG. 5

Low-priority group table 140

| Logical unit number 131 | Average load (MB/s) 132 | LU capacity (GB) 133 | Incurred I/O penalty amount (In the last 1 min) 134 | I/O penalty density 135 | Formatting order 136 |
|---|---|---|---|---|---|
| 2 | 300 | 500 | 100 | 0.20 | 1 |
| 3 | 300 | 500 | 50 | 0.10 | 4 |
| 4 | 285 | 500 | 60 | 0.12 | 3 |
| 6 | 270 | 500 | 80 | 0.16 | 2 |
| ... | ... | ... | ... | ... | ... |

FIG. 6

Formatting situation management table 150

| Logical unit number 131 | Status 151 | Progress [%] 152 |
|---|---|---|
| 0 | Executing | 60 |
| 1 | Unformatted | 0 |
| 2 | Completed | 100 |
| 3 | Executing | 15 |
| ... | ... | ... |

# STORAGE DEVICE AND METHOD OF CONTROLLING STORAGE SYSTEM

TECHNICAL FIELD

The present invention relates to a storage device and a method of controlling a storage system and to, for example, a storage device and a method of controlling a storage system that are capable of processing I/O requests from a host with respect to a storage volume undergoing formatting.

BACKGROUND ART

With storage systems, a user normally has to initialize a storage volume created in a PC, an external storage device, or the like, before storing data in the storage volume. This initialization is called formatting. In more specific terms, formatting refers to a process of writing in the storage volume initial values of partition information, directory and file names, and configuration information, or patterns that are defined per track and logical sector. Large external storage devices, of which high reliability is demanded, sometimes write a verification code for verifying the integrity of data per logical sector of the storage volume upon formatting.

In recent years, in order to accommodate the explosive increase in the amount of data handled by businesses and users, the capacity of storage media and storage volumes, such as HDDs and the like, has also shown a steady increase. On the other hand, because the rate of increase in such performance as data transfer capability and the like of HDDs has been significantly slower than the rate of increase in storage capacity, the time it takes to format storage volumes keeps increasing. In particular, large external storage devices have to write verification codes with respect to large storage volumes to format them, and thus sometimes take several hours or even several days to format, depending on the capacity of the installed storage device. Consequently, after installing large external storage devices, users sometimes must wait for a while before being able to start using them.

In order to address this problem, such quick formatting techniques as that disclosed in Patent Literature 1, for example, have conventionally been used where a host is able to use a storage volume undergoing formatting without having to wait for completion thereof. According to Patent Literature 1, a storage device executes normal formatting in the background, identifies whether or not a predetermined area in a storage volume is already formatted, and prepares a bitmap for managing the progress of the formatting. Then, in response to an access request from the host, the storage device references the bitmap, determines whether or not the relevant area is already formatted, and makes it possible to execute the access request from the host without having to wait for completion of the formatting by executing the access request if the area is already formatted, or, if the area is not already formatted, executing the access request after a formatting process has been executed with respect to the relevant area. It is noted that in Patent Literature 1, normal formatting is referred to as "sequential formatting," while the formatting of an area with respect to which an access request from a host is issued is referred to as "quick formatting." The two will be identified as such in the present specification as well.

CITATION LIST

Patent Literature

PTL 1: Japanese Patent Publication (Kokai) No. 2003-29934 A

SUMMARY OF INVENTION

Technical Problem

However, even with the technique disclosed in Patent Literature 1, the time it takes to complete the process of an access request from a host (more specifically, a series of processes from receiving a write request issued from the host up to storing in a storage volume the data to be written, for example) may be prolonged in some cases. For example, when a storage device such as a large external storage device receives an access request from a host with respect to an unformatted area of a storage volume for which sequential formatting and quick formatting are running concurrently, there arises a need for the large external storage device to execute such extra processes as creating and writing format data in addition to the access request from the host. These extra processes will be referred to as I/O penalties. Since an I/O penalty is a process that places a load on the CPU, cache memory, HDD, etc., access requests to a storage volume that frequently incurs I/O penalties tend to result in longer processing time, and in the worst case scenario, the storage device may cease to accept data transfer from the host. For example, in order for the storage device to store data from the host in a storage area that is unformatted, the storage device creates format data of the unformatted storage area, combines it with the data from the host in the cache memory, and thereafter stores it in the storage volume from the cache memory. When a large amount of data transfer is issued from the host, the cache memory will overflow with large amounts of data from the host and format data. If, under such conditions, an access request from the host is issued at a speed faster than the speed at which data in the cache memory is stored in the storage volume, the storage device will cease to accept data transfer from the host.

The present invention is made in view of such circumstances and provides a technique for efficiently formatting a storage volume so as not to prolong, as much as possible, the time taken to process an access request from a host.

Solution to Problem

In order to solve the problems above, in the present invention, a storage device manages, with respect to each of a plurality of storage volumes having an unformatted area, the load per predetermined reference unit (e.g., per medium (HDD)) constituting each storage volume, and/or, with respect to each of the plurality of storage volumes having the unformatted area, the I/O penalty density, which indicates the frequency with which I/O penalties are incurred per unit of storage volume capacity. Further, the storage device determines, in accordance with load values per predetermined reference unit mentioned above of the storage volume and/or the I/O penalty density, an order of priority of a sequential formatting process for the plurality of storage volumes, and executes the sequential formatting process with respect to the unformatted areas of the plurality of storage volumes in accordance with that order of priority.

In addition, the storage device manages a load threshold that is derived from the executable sequential formatting speed per predetermined reference unit and the limit performance per predetermined reference unit. Further, in this case, the storage device compares the load threshold with the loads of the plurality of storage volumes, divides the plurality of storage volumes into a high-priority group and a low-priority group, and executes, with priority, the sequential formatting process with respect to the storage volumes belonging to the high-priority group. In addition, in executing sequential formatting with respect to the storage volumes in each group, they are processed in order of descending I/O penalty density.

Further features of the present invention will become apparent from the following description of the preferred embodiments of the invention as well as the accompanying drawings.

ADVANTAGEOUS EFFECTS OF INVENTION

According to the present invention, by selecting, in accordance with the load statuses of storage media, the order of storage volumes for executing sequential formatting, it is possible to prevent prolongation of processing time for an access request from a host with respect to a storage volume undergoing quick formatting.

BRIEF DESCRIPTION OF DRAWINGS

FIG. 4 is a diagram showing a configuration example of a high-priority group table used in the present invention.

FIG. 5 is a diagram showing a configuration example of a low-priority group table used in the present invention.

FIG. 6 is a diagram showing a configuration example of a formatting situation management table used in the present invention.

DESCRIPTION OF EMBODIMENTS

Figure 1:
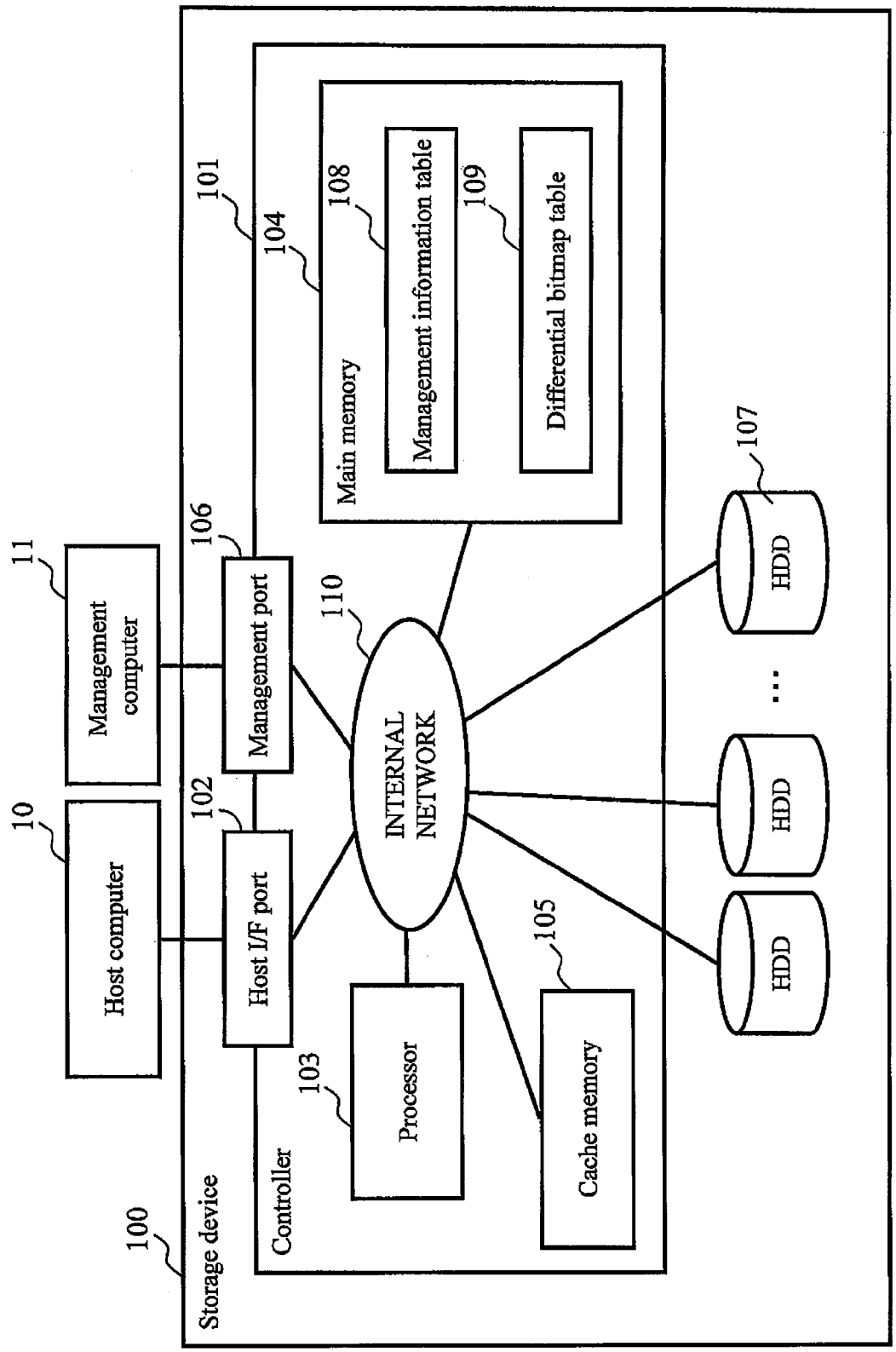
FIG. 1 is a block diagram showing a schematic configuration example of a storage system according to the first embodiment of the present invention.

The present invention relates to a formatting volume selection method that decreases influences on the performance of a host that are incurred when an I/O request is made with respect to a storage volume undergoing formatting.

Embodiments of the present invention are described below with reference to the accompanying drawings. However, it is to be understood that these embodiments are merely examples for realizing the present invention and do not in any way limit the technical scope of the present invention. Further, like elements are designated with like reference numerals in the drawings. Since elements designated with like reference numerals perform essentially like operations, descriptions therefor are omitted in some cases.

(1) First Embodiment

<Storage System Configuration>

FIG. 1 is a block diagram showing a schematic configuration example of a storage system according to the first embodiment of the present invention. The storage system comprises a storage device 100, a host computer 10, and a management computer 11.

The storage device 100 comprises at least one controller 101, and at least one HDD 107 that stores data. The controller 101 comprises: at least one host interface port 102 that transmits/receives data to/from the host computer 10; at least one processor 103 that executes various processes; at least one main memory 104 that stores a control program that executes control of the storage device 100 as a whole, and the like; at least one cache memory 105; at least one management port 106 that transmits/receives data to/from the management computer 11; and an internal network 110 that interconnects these components.

In addition, the storage device 100 provides to the host computer 10 in response to an access request a logical storage volume (hereinafter also referred to as LU (Logical Unit)) composed of the plurality of HDDs 107 that employ a RAID configuration.

The main memory 104 and the cache memory 105 may be the same memory. The main memory 104 comprises a management information table 108 and a differential bitmap table 109. The management information table 108 comprises a threshold information table, a high-priority group table, and a low-priority group table, which are later described in further detail.

<Quick Formatting Process>

Figure 2:
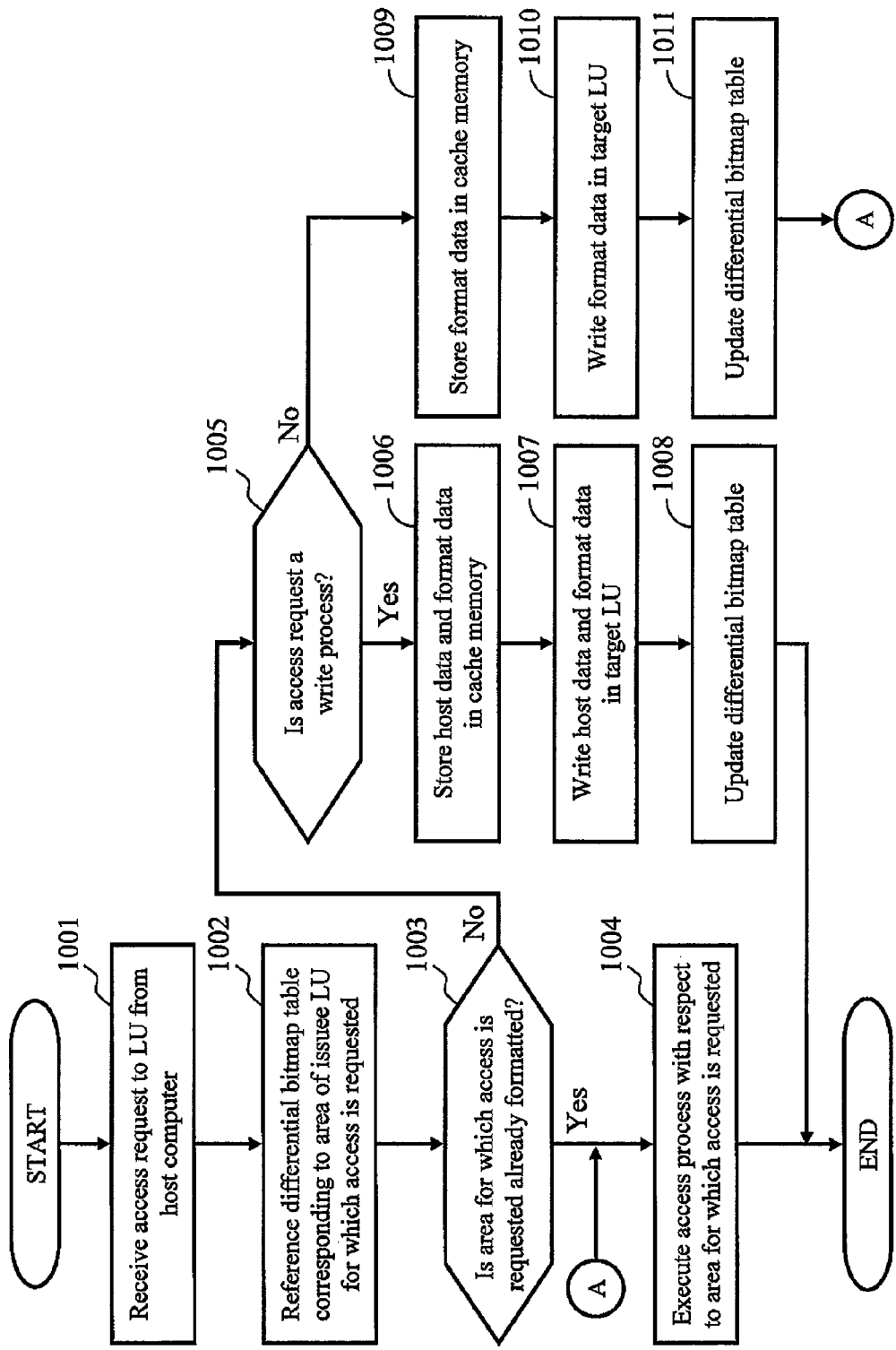
FIG. 2 is a flowchart illustrating the content of a quick formatting process.

FIG. 2 is a flowchart illustrating the content of a quick formatting process applied in the present invention. It is noted that while in this process it is assumed that the processor 103 plays an active part in processing, the process is by no means limited as such. Further, while the other processing flows that are described later are also described on the assumption that the processor 103 chiefly performs processing, they are by no means limited as such.

The processor 103 receives from the host computer 10 an access request for an LU (step 1001). This access request may include, for example, a command type such as read or write, an identifier of the issuer host computer 10, an identifier of the issuee LU, an identifier indicating the area in the issuee LU for which access is requested, transfer data length, and the like.

Next, the processor 103 references the differential bitmap table 109 corresponding to the area in the issuee LU for which access is requested (step 1002). The differential bitmap table 109 is stored in the main memory 104, and is a bitmap that stores, per predetermined area of the LU within the storage device 100, a record of whether or not formatting has been completed. For example, if a given area is already formatted, the corresponding bit in the differential bitmap table 109 would be 1, whereas it would be 0 if unformatted. Further, since the total capacity of the LU that the storage device 100 is able to handle may sometimes be greater than the capacity of the main memory 104, one bit of the differential bitmap table 109 may represent a larger area. For example, one bit of the differential bitmap table 109 may represent 1 MB of the storage capacity of the LU.

Next, with the result from referencing the differential bitmap table 109, the processor 103 determines whether or not the area of the issuee LU for which access is requested is already formatted (step 1003). This may be done by referencing whether the corresponding bit of the differential bitmap table 109 is 1 or 0 as discussed above.

If the area for which access is requested is already formatted (Yes in step 1003), the processor 103 executes an access process with respect to the area of the issuee LU for which access is requested (step 1004). In step 1004, the processor 103 may perform a read process if the access request from the host computer 10 is a read, and a write process if the access request is a write.

On the other hand, if the area for which access is requested is unformatted (No in step 1003), the processor 103 starts a process for executing the access request as shown with steps 1005 through 1011.

First, the processor 103 determines whether or not the received access request is a write process (step 1005). This is because the content of the process with respect to the LU differs depending on whether or not the access request is a write process.

If the access request is a write process (Yes in step 1005), the processor 103 stores in the cache memory 105 the data received from the host and, further, creates format data and stores it in the cache memory 105 (step 1006). Here, the term format data refers to, for example, a verification code to be added to each logical sector of the LU. In large external storage devices, since a verification code for verifying data integrity per logical sector of an LU is added when the LU is formatted, a verification code is created in step 1006 in the present embodiment. The format data needs to be created per unit area represented by one bit of the differential bitmap table 109. For example, if one bit of the differential bitmap table 109 represents 1 MB's worth of the area of the LU, the format data is created in the cache memory 105 in units of 1 MB, and there would have to be at least 1 MB's worth thereof.

The processor 103 subsequently writes, from the cache memory 105 and to the area of the issuee LU for which access is requested, the data received from the host and the format data (step 1007). In step 1007, the formatting process would be completed for the area of the issuee LU for which access requested.

The processor 103 then updates the differential bitmap table 109 (step 1008). Specifically, the processor 103 updates the bit referenced in step 1002 to formatted (to 1, for example).

On the other hand, if the access request is not a write process, that is, if it is a read process (No in step 1005), the processor 103 creates format data in the cache memory 105 (step 1009). This format data is the same data as the format data in step 1006. However, since the access request is not a write process, and there is no data transfer from the host, there is no need for the processor 103 to store in the cache memory 105 data from the host. Format data (verification code) is written in the access area of the LU in the read process as well. This is because the read process is executed with respect to an unformatted area, and because an appropriate read process cannot be executed unless formatting has been performed.

The processor 103 then writes the format data in the area of the issuee LU for which access is requested (step 1010), and updates the differential bitmap table 109 (step 1011). The process then moves to step 1004.

<Management Information Table>

Figure 3:
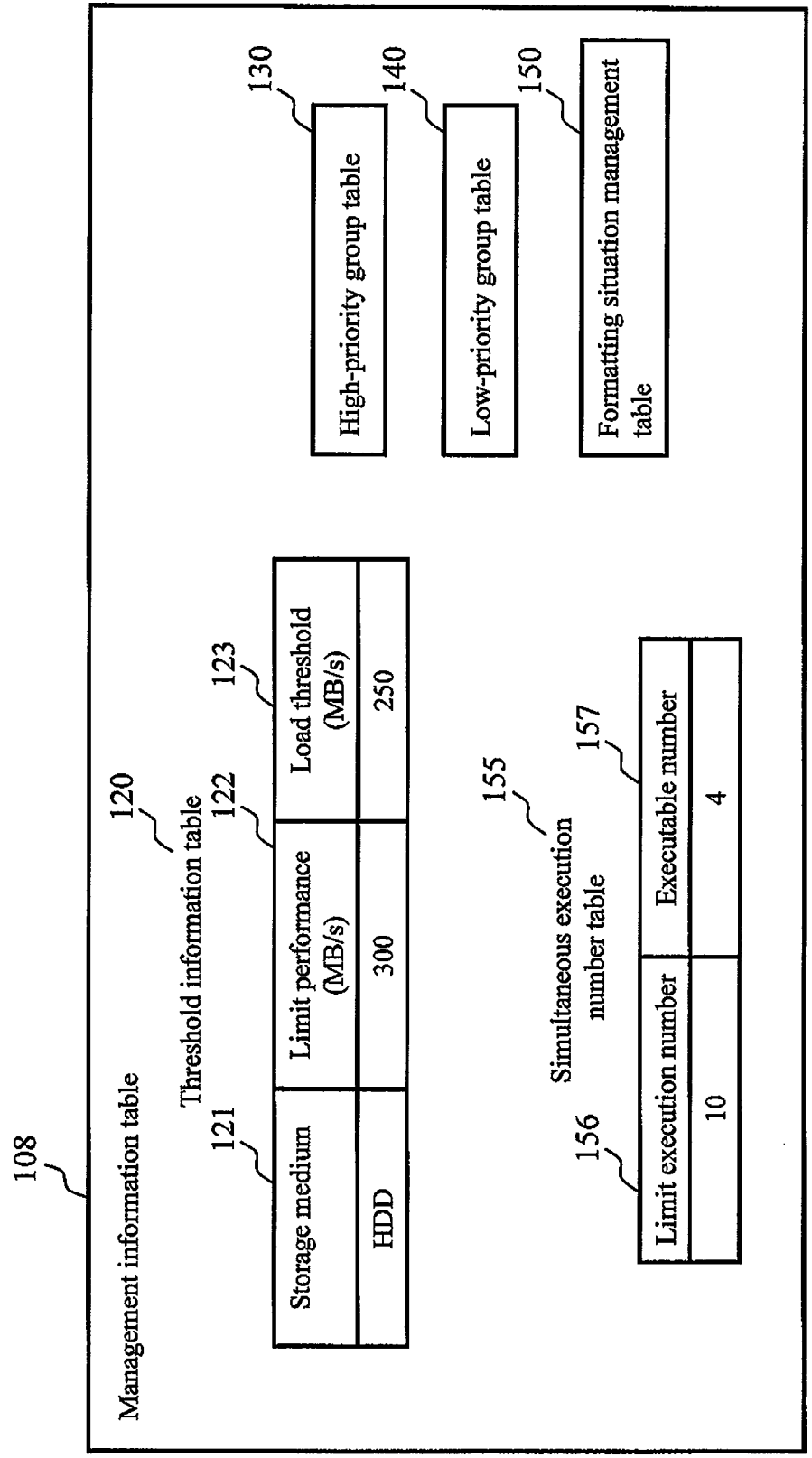
FIG. 3 is a diagram showing a configuration example of a management information table within a storage device used in the first embodiment of the present invention.

FIG. 3 is a diagram showing a configuration example of the management information table 108 used in the present invention. The management information table 108 comprises a threshold information table 120, a high-priority group table 130, a low-priority group table 140, a formatting situation management table 150, and a simultaneous execution number table 155.

The threshold information table 120 is a table comprising storage medium 121, limit performance 122, and load threshold 123. In the storage medium 121 column, the processor 103, for example, acquires and registers information on the type of storage medium (e.g., HDD) mounted in the storage device 100. In the limit performance 122 column, the processor 103, for example, acquires and registers information on the limit performance of the storage media registered in the storage medium 121 column. Here, the term limit performance refers to, for example, data transfer capability per unit time (MB/s), and the like. In the load threshold 123 column, the processor 103, for example, acquires and registers threshold information for determining whether or not to execute, with priority, sequential formatting with respect to an LU composed of the storage media registered in the storage medium 121 column. Here, the load threshold is, for example, a numerical value that is obtained by subtracting, from the limit performance of the storage medium (for example, 300 MB/s), the sequential formatting speed per storage medium (for example, 50 MB/s) executable by the storage device 100. It is noted that preset values may be registered in the threshold information table 120, or the processor 103 may measure and register the limit performance of storage media each time a storage medium is connected to the storage device 100.

The high-priority group table 130 is a table that groups, of the LUs mounted in the storage device 100, LUs for which sequential formatting is to be executed with priority. In addition, the low-priority group table 140 is a table that groups, of the LUs the storage device 100 has, LUs for which sequential formatting is to be executed without priority (i.e., LUs for which processing is to be executed after the LUs included in the high-priority group have been processed with priority). In which of the high-priority group table 130 and the low-priority group table 140 an LU should be registered is determined based on whether or not the load exerted on the storage media that compose the LU by the host computer 10 is equal to or greater than the load threshold 123 in the threshold information table 120. In other words, if the load per storage medium that composes the LU exerted by the host computer 10 is equal to or greater than the load threshold 123, the LU in question is registered in the low-priority group table 140, whereas if it is less than the load threshold 123, the LU is registered in the high-priority group table 130. Details of the process for determining which group to register in and the reason for performing this grouping will be discussed later. The high-priority group table 130 will be described using FIG. 4, and the low-priority group table 140 using FIG. 5.

The formatting situation management table 150 is a table for indicating the progress of the formatting process with respect to the LUs in the storage device 100. The formatting situation management table 150 will be described using FIG. 6.

The simultaneous execution number table 155 is, for cases where the storage device 100 is capable of simultaneously executing sequential formatting with respect to a plurality of LUs, a table for managing the number of LUs for which sequential formatting can be executed simultaneously. The simultaneous execution number table 155 comprises, as information to be managed, limit execution number 156 and executable number 157.

The limit execution number 156 is information that indicates an upper limit value for the number of LUs that the storage device 100 is capable of simultaneously executing sequential formatting for. For example, if the limit execution number 156 is 10, it signifies that sequential formatting can be simultaneously executed with respect to up to ten LUs.

The executable number 157 is information that indicates the number of LUs for which sequential formatting can further be executed simultaneously at a given moment. For example, if the executable number 157 is 4, sequential formatting is simultaneously executable with respect to four more LUs. The executable number 157 may assume a numerical value within the range of zero up to the limit execution number 156.

Further, while the limit execution number 156 is a fixed value, it may increase in some cases due to improvements in the control program of the storage device 100 or due to improvements in the controller 101. The executable number 157 may be registered in the simultaneous execution number table 155 by having, for example, the processor 103 acquire the number of LUs for which sequential formatting is being executed simultaneously, and subtracting that number from the limit execution number 156.

<High-Priority Group Table>

FIG. 4 is a diagram showing a configuration example of the high-priority group table 130. The high-priority group table 130 comprises, as information to be managed, logical unit number 131, average load 132, LU capacity 133, incurred I/O penalty amount 134, I/O penalty density 135, and formatting order 136.

The logical unit number 131 is an identifier for identifying an LU that is registered in the storage device 100 and may be, for example, an LUN (Logical Unit Number) or some other name. However, since the high-priority group table 130 and the later-described low-priority group table 140 are tables for registering only those LUs for which formatting has not been completed, LUs undergoing sequential formatting and LUs for which formatting has been completed are excluded from the high-priority group table 130 and the low-priority group table 140.

The average load 132 is the load exerted per storage medium and is the load exerted by the host computer 10 on the storage media that compose the LU represented by the logical unit number 131. This average load is determined by the amount of access (I/O) with respect to the storage media in question regardless of whether or not the storage media are formatted. It is noted that this is because, in the present invention, the focus is on the magnitude of the load per storage medium that composes an LU instead of that of the load on the LU. In the case of a large external storage device, in order to ensure high reliability, an LU is sometimes composed of a plurality of HDDs. However, the number of HDDs that compose the LU sometimes varies depending on the RAID configuration. An LU composed of a greater number of HDDs is higher in limit performance. On the other hand, if the HDD type is the same, the limit performance of the HDD would be the same. For this reason, instead of the load on the LU, the average load per storage medium that composes the LU is registered. For example, if a given LU assumes a RAID 5 configuration comprising five HDDs, the processor 103 registers the load per HDD by dividing the total load on the LU by five, which is the number of HDDs. The total load on the LU may be acquired by the processor 103, for example. It is noted that while in the case above the load per storage medium is taken as a reference, this need not be the case, and as long as the load on each LU is calculated in uniform units, any such unit as units of 1 bit, units of 1 byte, etc., may be taken to be a reference for calculating the load.

The LU capacity 133 is the total capacity of the LU represented by the logical unit number 131.

The incurred I/O penalty amount 134 indicates the amount of incurred I/O penalties per unit time with respect to the LU represented by the logical unit number 131. Here, the term I/O penalty refers to a case in which an access request from the host computer 10 is issued with respect to an unformatted area of an LU undergoing quick formatting, that is, it refers to the execution of the process represented by steps 1005 through 1011 shown in FIG. 2, and is a process that is required in addition to the process that addresses the access request by the host computer 10. Therefore, the incurred I/O penalty amount is determined by the amount of I/O with respect to unformatted areas. With this I/O penalty, processes in which the processor 103 creates format data, stores the format data in the cache memory 105, writes to the LU, and the like are incurred. For this reason, as compared to a process addressing an access request from the host computer 10, an I/O penalty is a process which places a greater load on the cache memory 105, the processor 103, and the LU. It may be said that the greater the incurred I/O penalty amount per unit time of an LU is, the greater the load of that LU is. For the incurred I/O penalty amount, the processor 103, for example, may count and manage the results from referencing the differential bitmap table 109 in steps 1002 and 1003 in FIG. 2.

The I/O penalty density 135 is a value that is obtained by dividing the incurred I/O penalty amount 134 by the LU capacity 133. I/O penalty density is a numerical value that is obtained by dividing the above-mentioned incurred I/O penalty amount per unit time by the total capacity of an LU, and it indicates the frequency of incurred I/O penalties per unit capacity. A greater I/O penalty density of an LU signifies that more random access requests are issued from the host computer 10 with respect to a small storage area.

The relationship between sequential formatting order and I/O penalty density will now be described. Sequential formatting is a process in which the processor 103, for example, creates format data and writes the format data in the order of consecutive addresses in the LU. The processing speed of sequential formatting is determined by the processing performance of the processor 103, the HDDs 107, and other parts, as well as by the RAID configuration of the HDDs 107 that compose the LU. However, with respect to the present invention, for purposes of brevity, it is assumed that the sequential formatting process is such that a uniform load is exerted on all LUs undergoing a sequential formatting process, and that all sequential formatting processes proceed at the same speed. Thus, the time taken to complete sequential formatting would be proportionate to the LU capacity.

Next, the incurred I/O penalty amount that can be suppressed by the sequential formatting process per unit time will be considered. I/O penalties are not incurred in areas that are already formatted, and the processing speed of sequential formatting is fixed for each LU. Therefore, by executing a sequential formatting process with respect to an LU in which I/O penalties are incurred intensively in a smaller area, it is possible to suppress the incurred I/O penalty amount per unit time. Suppressing the incurred I/O penalty amount leads to suppression of the load exerted on such various parts as the processor 103, the cache memory 105, the HDDs 107, and the like, of the storage device 100, thus making it possible to prevent prolongation of the time taken to process access requests from the host computer 10. As such, in the present invention, the sequential formatting process is executed with respect to LUs in order of descending density of incurred I/O penalties.

The formatting order 136 is a numerical value indicating the order of the magnitude of the I/O penalty density 135 for the logical unit numbers registered in the high-priority group table 130, and it indicates the order in which the processor 103 is to execute sequential formatting of the LUs in the high-priority group table 130. The timing for determining the order in which sequential formatting is to be executed will be described later.

<Low-Priority Group Table>

FIG. 5 is a diagram showing a configuration example of the low-priority group table 140 used in the present invention. As with the high-priority group table 130, the low-priority group table 140 comprises, as information to be managed, the logical unit number 131, the average load 132, the LU capacity 133, the incurred I/O penalty amount 134, the I/O penalty density 135, and the formatting order 136.

The contents that the processor 103 registers in the low-priority group table 140 is the same as those in the high-priority group table 130, but LU identifiers to be registered in the logical unit number 131 are not allowed to duplicate those in the high-priority group table 130. Further, by way of a later-described grading process, LUs for which formatting has not been completed may in some cases be reregistered in either the high-priority group table 130 or the low-priority group table 140 by the processor 103 depending on the load at the time of the grading process.

<Formatting Situation Management Table>

FIG. 6 is a diagram showing a configuration example of the formatting situation management table 150 used in the present invention. The formatting situation management table 150 comprises, as information to be managed, the logical unit number 131, status 151, and progress 152.

The logical unit number 131 is the same information as that in the high-priority group table 130 and the low-priority group table 140.

The status 151 is an item indicating the status regarding formatting with respect to the LU represented by the logical unit number 131. For example, the processor 103 will acquire the information "unformatted" if formatting has not been performed yet, "executing" if formatting is being executed, and "completed" if formatting has been completed, and this information is successively registered in the status 151 column. The processor 103 registers (leaves) in the high-priority group table 130 and the low-priority group table 140 only the information of LUs whose status 151 is "unformatted," and deletes from those tables LUs whose status 151 is "executing" or "completed."

The progress 152 is an item indicating the progress of the formatting process with respect to the LU represented by the logical unit number 131. For the progress 152, the processor 103, for example, may reference the differential bitmap 109 and register the numerical value indicating the progress of the formatting process for each LU.

<Sequential Formatting Process>

Figure 7:
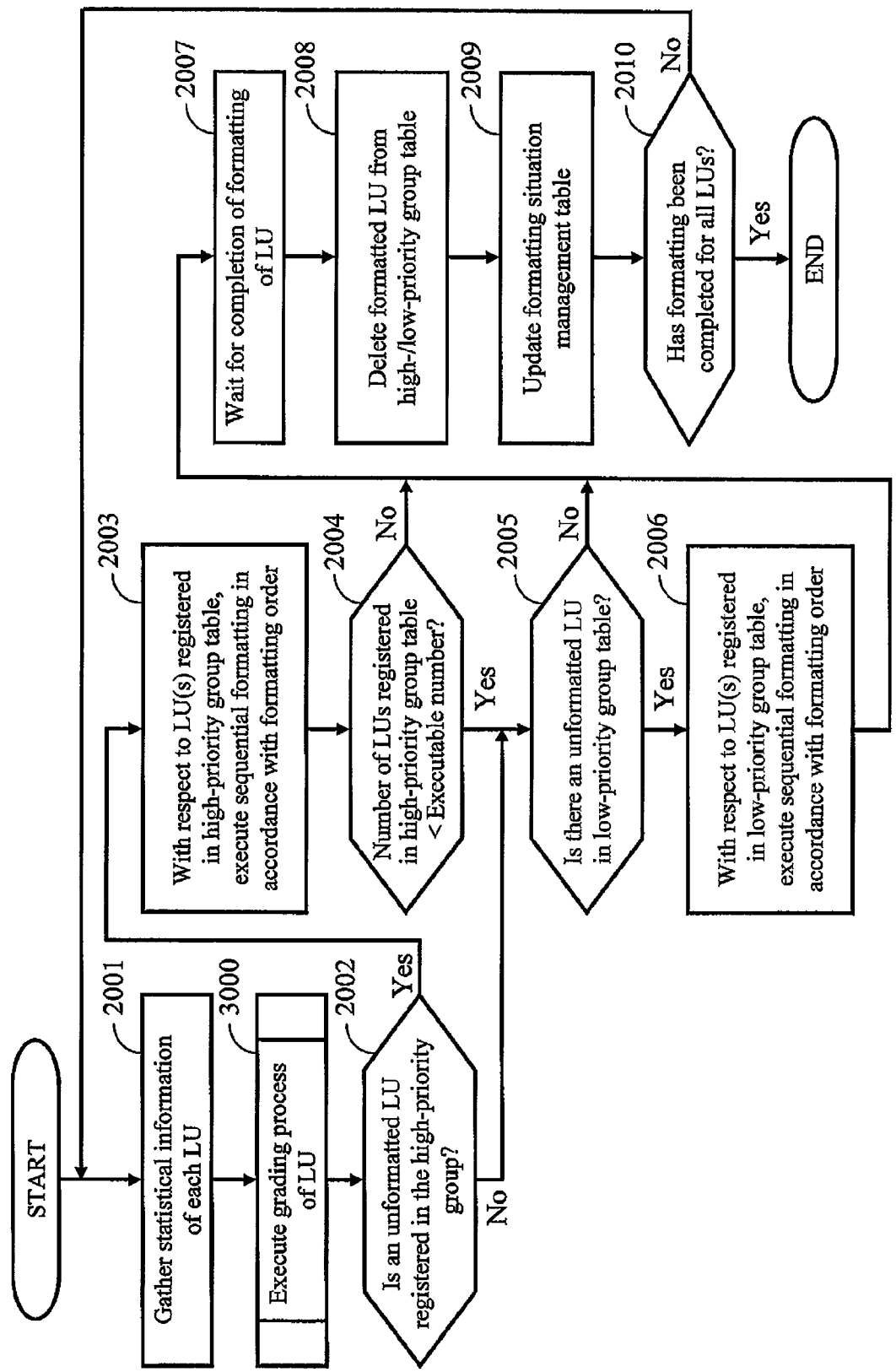
FIG. 7 is a flowchart illustrating the content of a sequential formatting process in the present invention.

FIG. 7 is a flowchart illustrating a sequential formatting process in the present invention. This process is executed, after the user or administrator of the storage device 100 instructs the storage device 100 to start the formatting process for LUs, in the background of the quick formatting process shown in FIG. 2. Various processes are described below. Here, too, the processes will be described taking the processor 103 to be the performer of the operations.

First, the processor 103 acquires statistical information for each LU registered in the storage device 100 (step 2001). Here, the term statistical information refers to the load per storage medium that composes an LU for determining which of the high-priority group table 130 and the low-priority group table 140 the LU is to be registered in, the incurred I/O penalty amount of the LU and the LU capacity for calculating the I/O penalty density, and the like. The statistical information need only be gathered by the processor 103 with respect only to LUs for which a formatting process has not been completed.

Next, the processor 103 performs a grading process for the LUs based on the acquired statistical information (step 3000). The LU grading process is a process in which, depending on the load per storage medium acquired in step 2001, the processor 103 registers in either the high-priority group table 130 or the low-priority group table 140 LUs for which formatting has not been completed (i.e., those that are unformatted), and further calculates the I/O penalty density of each LU within the high-priority group table 130 or the low-priority group table 140, thus arriving at the formatting order for the LUs. A detailed flow of the process will be described with reference to FIG. 8.

The processor 103 then references the high-priority group table 130 and determines if one or more LUs are registered in the high-priority group table 130 (step 2002). If no unformatted LUs are registered in the high-priority group table 130 (No in step 2002), the processor 103 takes the process to step 2005, and executes a sequential formatting process with respect to the LUs registered in the low-priority group table 140.

On the other hand, if an LU(s) is/are registered in the high-priority group table 130 (Yes in step 2002), the processor 103 executes according to the formatting order 136 sequential formatting with respect to the LU(s) registered in the high-priority group table 130 (step 2003). If the executable number 157 is 2 or greater, sequential formatting may be executed with respect to the same number of LUs as the executable number 157. However, when the executable number 157 is greater than the number of LUs registered in the high-priority group table 130, even if sequential formatting were executed with respect to all LUs in the high-priority group table 130, the processor 103 would still be able to simultaneously execute sequential formatting with respect to yet other LUs.

As such, the processor 103 compares the number of LUs registered in the high-priority group table 130 with the executable number 157 (step 2004).

If, from the comparison, it turns out that the executable number 157 is greater (Yes in step 2004), the processor 103 references the low-priority group table 140 and determines whether or not one or more unformatted LUs are registered in the low-priority group table 140 (step 2005). This is for the processor 103 to execute the executable number 157's worth of formatting processes with respect to the LUs registered in the low-priority group table 140.

If, from the determination, it turns out that an unformatted LU(s) is/are registered in the low-priority group table 140 (Yes in step 2005), the processor 103 executes, in accordance with the formatting order 136, sequential formatting with respect to the LU(s) registered in the low-priority group table 140 (step 2006). If, in step 2006, the executable number 157 is 2 or greater, sequential formatting may be executed with respect to the same number of LUs as the executable number 157. If, in step 2006, the executable number 157 is smaller than the number of LUs registered in the low-priority group table 140, sequential formatting may be executed for as many LUs as the executable number.

After executing sequential formatting in step 2006, the processor 103 waits for completion of the formatting of the LU (step 2007). Here, the processor 103 updates the differential bitmap table 109 as the sequential formatting of the LU progresses or periodically. Therefore, whether or not LU formatting has been completed may be monitored by periodically referencing the differential bitmap table 109, for example. The differential bitmap table 109 is also updated in step 1008 shown in FIG. 2. Therefore, in cases where the storage device 100 is equipped with a plurality of the processors 103, the respective processors 103 may assume exclusive control to update the differential bitmap table 109.

If the number of LUs registered in the high-priority group table 130 is greater (No in step 2004), the processor 103 takes the process to step 2007. This is because sequential formatting cannot be executed with respect to other LUs due to the fact that the executable number 157 drops to 0. In addition, the processor 103 also takes the process to step 2007 if no unformatted LU is registered in the low-priority group table 140 (No in step 2005).

If the processor 103 then determines that the formatting of the LU has been completed, the processor 103 deletes the formatted LU from the high-priority group table 130 or the low-priority group table 140 (step 2008). Although, in the description above, the deletion timing is set to the time at which formatting is completed, deletion may also take place when formatting begins (i.e., while formatting is being executed).

Further, the processor 103 updates the formatting situation management table 150 (step 2009). Specifically, the processor 103 may reference the differential bitmap table 109, and if there is an LU for which formatting has been completed, update the status 151 of the logical unit number 131 representing the formatted LU to "completed" while updating the progress 152 of the logical unit numbers 131 representing other LUs undergoing formatting with the most recent information.

Finally, the processor 103 determines if the formatting process has been completed for all LUs in the storage device 100 (step 2010). This may be done by referencing the status 151 in the formatting situation management table 150 and determining if all LUs are "completed" (Yes) or if there is even one LU that is not "completed" (No). If the formatting process is completed for all LUs (Yes in step 2010), the processor 103 terminates the sequential formatting process. If there is one or more LUs for which formatting is not completed (No in step 2010), the processor 103 takes the process to step 2001, and repeatedly performs the succession of steps.

<Details of the Grading Process>

Figure 8:
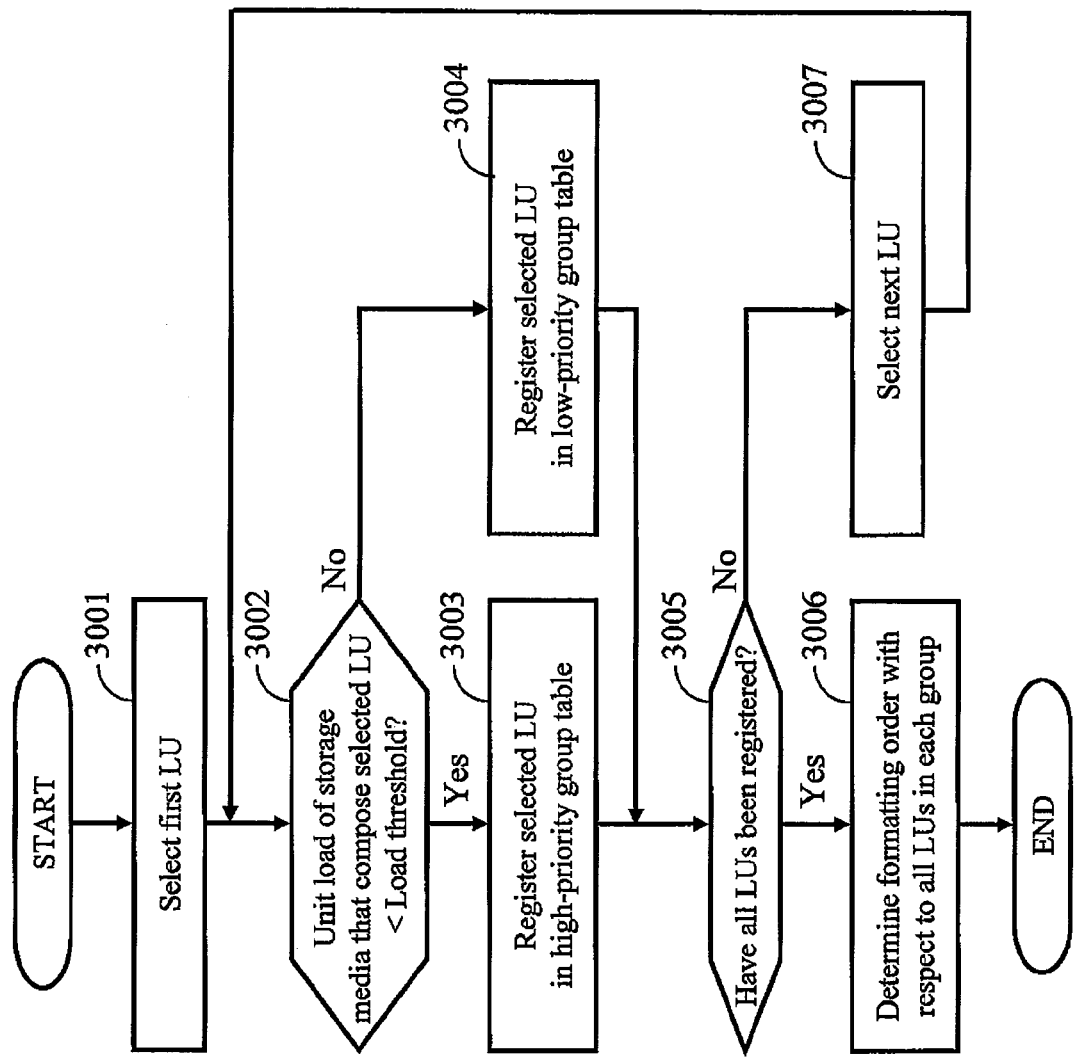
FIG. 8 is a flowchart illustrating the content of a grading process in the present invention.

FIG. 8 is a flowchart illustrating the details of the grading process (step 3000) in FIG. 7.

The processor 103 selects the LU to be processed first (step 3001) and compares with the load threshold 123 the load exerted per storage medium that composes the selected LU (step 3002).

If the load of the storage media is less than the load threshold 123 (Yes in step 3002), the processor 103 registers the LU selected in step 3001 in the high-priority group table 130 (step 3003).

On the other hand, if the load of the storage media is equal to or greater than the load threshold 123 (No in step 3002), the processor 103 registers the LU selected in step 3001 in the low-priority group table 140 (step 3004). This is to postpone the sequential formatting process by registering the LU in the low-priority group table 140, because when the load exerted per storage medium is greater than the load threshold 123 and the sequential formatting process is executed with respect to that LU, the storage media become a performance bottleneck, and the time taken to process access requests from the host computer 10 becomes prolonged. On the contrary, when the load of the storage media is less than the load threshold 123, the storage media do not become a performance bottleneck even when the sequential formatting process is executed with respect to that LU, and the time taken to process access requests from the host computer 10 does not become prolonged. Therefore, the sequential formatting process is executed with priority through registration in the high-priority group table 130.

Next, the processor 103 determines if all LUs in the storage device 100 have been registered in the high-priority group table 130 or the low-priority group table 140 in step 3003 or 3004 (step 3005).

If there is an LU that is not registered yet (No in step 3005), the processor 103 selects the next LU (step 3007), and takes the process to step 3002. On the other hand, if all LUs are registered (Yes in step 3005), the processor 103 assigns the formatting order 136 to all LUs that are registered in the high-priority group table 130 and the low-priority group table 140. The formatting order 136 may be assigned in order of, of the statistical information acquired in step 2001 in FIG. 7, decreasing I/O penalty density. After the formatting order is assigned in step 3006 with respect to all LUs registered in the high-priority group table 130 and the low-priority group table 140, the processor 103 terminates the grading process.

<Formatting Policy Selection>

In the present invention, a different LU selection method may be used concurrently with the above-described LU selection method. Such a different LU selection method may include, for example: a method that minimizes the time it takes to format all LUs; a method that simply executes formatting in the order in which the LUs are created; or a method in which the user selects the order of the LUs to be formatted. A selection method that minimizes the time it takes to format all LUs may, for example, acquire statistical information on the LUs as in the present invention, and execute formatting of the LUs in order of increasing storage media load.

The user or the administrator may select one method from such plural LU selection methods and have it executed by the storage device 100. If the user or the administrator is to make a selection, a formatting policy selection screen such as the one shown in FIG. 9 may be displayed on the host computer 10 or the management computer 11.

Figure 9:
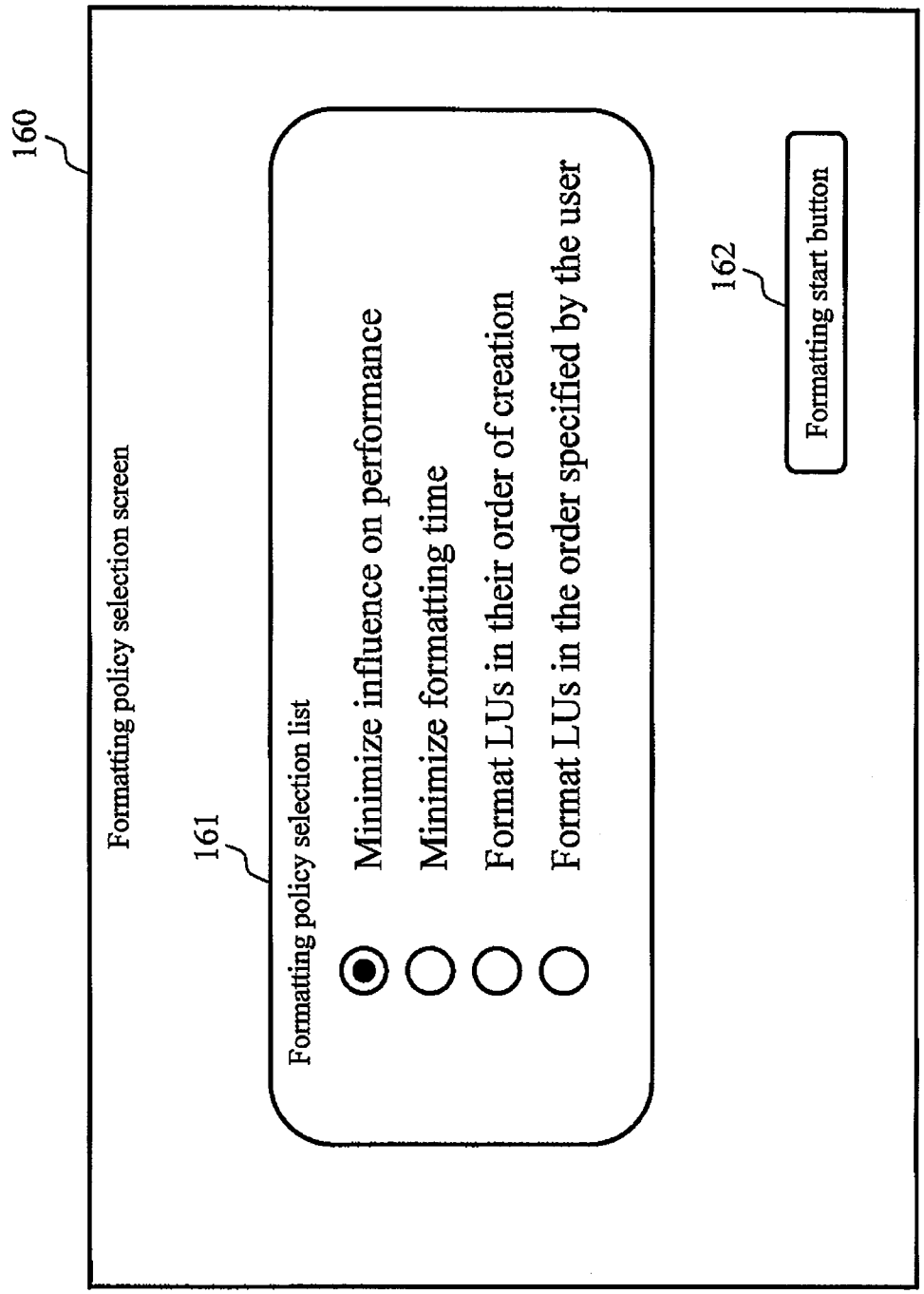
FIG. 9 is a diagram showing an example of a formatting policy selection screen in the present invention.

FIG. 9 is a diagram showing a configuration example of a formatting policy selection screen 160 in the present invention. The formatting policy selection screen 160 comprises a formatting policy selection list 161, and a formatting start button 162. The formatting policy selection list 161 may be any list that has such an interface that the user or the administrator is to select one method from among a plurality of LU selection methods. Further, by pressing the formatting start button 162 after the user or the administrator selects an LU selection method through the formatting policy selection screen 161, a formatting process is executed in accordance with the selected LU selection method.

<Formatting Progress Display Screen>

Figure 10:
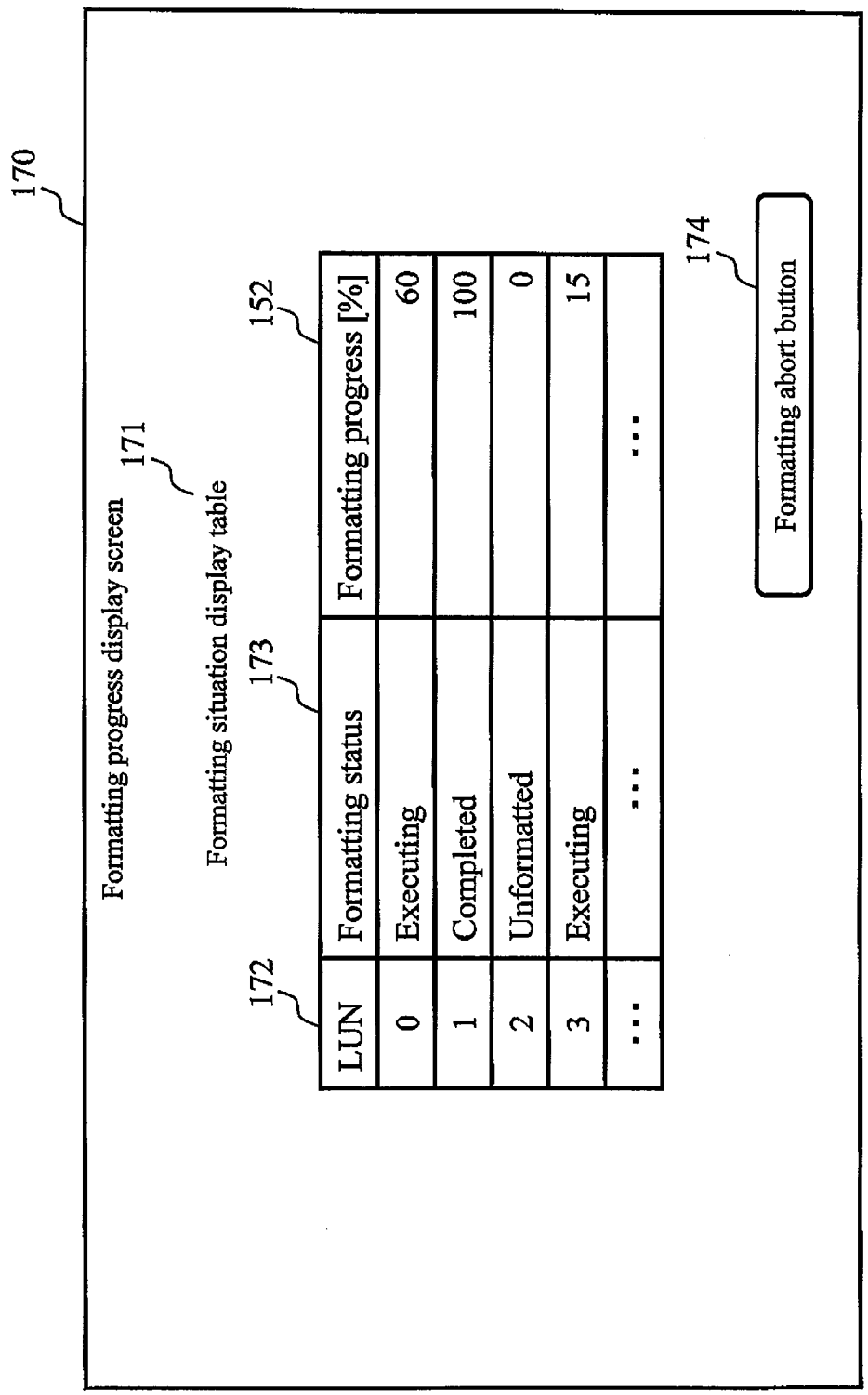
FIG. 10 is a diagram showing an example of a formatting progress display screen in the present invention.

FIG. 10 is a diagram showing a configuration example of a formatting progress display screen 170 in the present invention. The formatting progress display screen 170 shows information that is displayed on a display device (not shown) of the host computer 10 and/or the management computer 11, and comprises a formatting situation display table 171 and a formatting abort button 174.

The formatting situation display table 171 is a table for showing the progress of the LU formatting process to the user or the administrator, and comprises: logical unit number 172, formatting status 173, and the progress 152. Here, the logical unit number 172 is an identifier for uniquely identifying an LU, and may, for example, be a number that is assigned in the order in which LUs are created. Further, the formatting status 173 is an item that indicates the status of the formatting process for the LU represented by the logical unit number 172, and for which, for example, "completed" is displayed if the formatting process has been completed, "executing" if the formatting process is being executed, and "unformatted" if unformatted. The progress 152 is the same information as the progress 152 in FIG. 6.

The formatting abort button 174 is a button to be pressed by the user or the administrator in order to abort a formatting process that is being executed. The formatting abort button 174 may be provided for each logical unit number 172 in the formatting situation display table.

(2) Second Embodiment

<Storage System Configuration>

Figure 11:
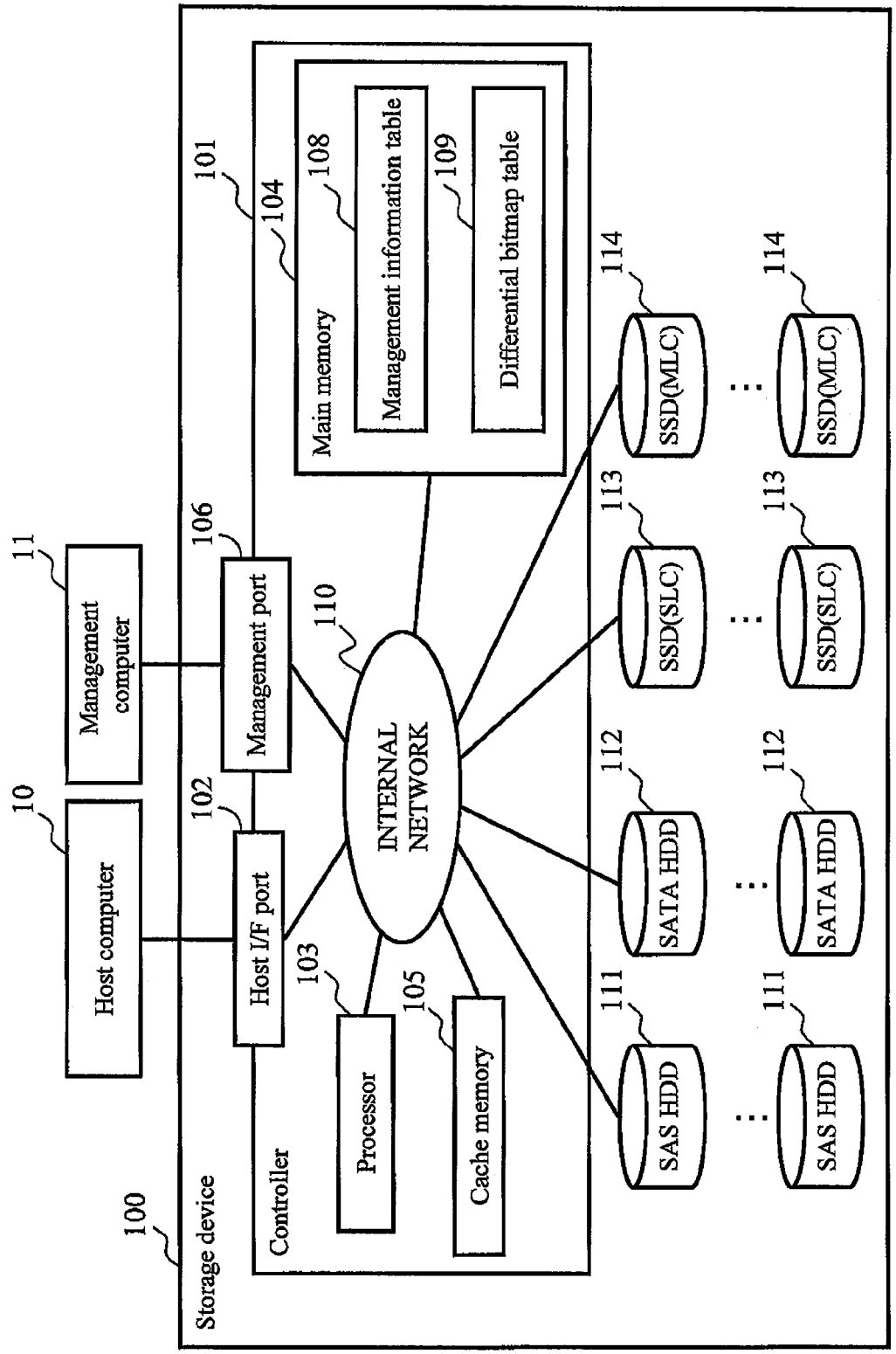
FIG. 11 is a block diagram showing a schematic configuration example of a storage system according to the second embodiment of the present invention.

FIG. 11 is a block diagram showing a schematic configuration example of a storage system according to the second embodiment. In the first embodiment, the storage media in the storage device 100 consisted of only one type, namely, the HDDs 107. However, the storage device 100 according to the second embodiment differs from that of the first embodiment in that it comprises several types of storage media such as SAS (Serial Attached SCSI) HDDs 111, SATA (Serial ATA) HDDs 112, SLC (Single Level Cell) SSDs 113, MLC (Multi Level Cell) SSDs 114, and the like.

An SSD (Solid State Drive) is a storage medium that employs flash memory as a storage medium and that can be connected with the same interface as an HDD. Since SSDs do not have, unlike HDDs, mechanically driven parts, they are considered to be superior particularly in terms of random access performance as compared to HDDs.

Further, in the second embodiment, storage media with varying form factors may coexist. For example, a 3.5-inch SAS HDD 111 and a 2.5-inch SAS HDD 111 may coexist. It is noted that in the second embodiment, descriptions for parts that do not differ from those in the first embodiment are omitted, while placing an emphasis on those parts that do differ.

<Management Information Table>

Figure 12:
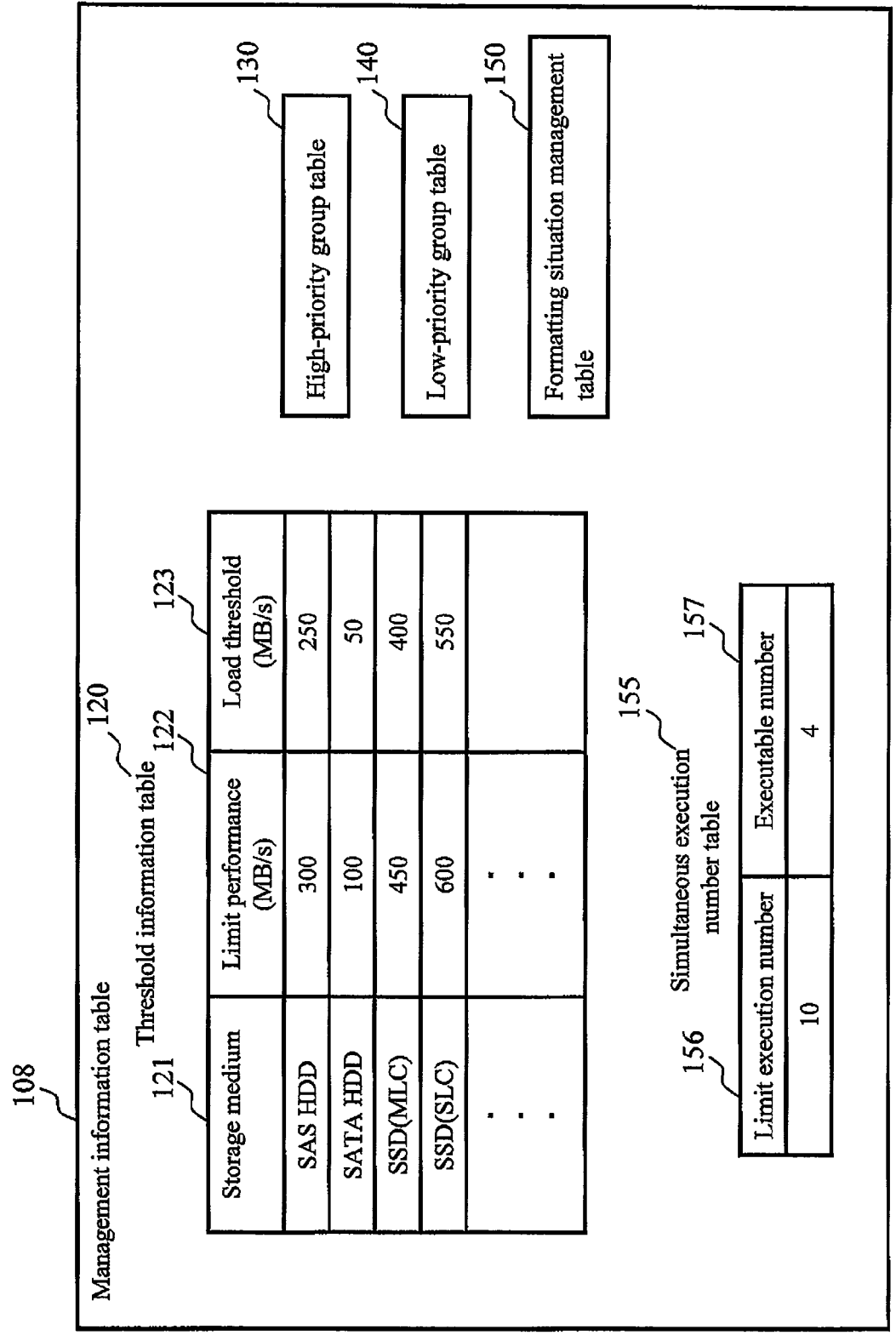
FIG. 12 is a diagram showing a configuration example of a management information table within a storage device used in the second embodiment of the present invention.

FIG. 12 is a diagram showing a configuration example of the management information table 108 used in the second embodiment. It differs from that of the first embodiment in that the information the processor 103 registers in the threshold information table 120 has increased to the number of types of storage media in the storage device 100. It is noted that in the second embodiment, too, preset values may be registered in the threshold information table 120, or the processor 103 may measure and register the limit performance of a storage medium each time a different type of storage medium is connected to the storage device 100.

<Formatting Process>

The process flow of the quick formatting process in the second embodiment does not differ from the quick formatting process in the first embodiment (FIG. 2).

On the other hand, the sequential formatting process in the second embodiment differs in that, whereas in the first embodiment the processor 103, in step 3002 in FIG. 8, compares with the load threshold 123 the load per storage medium that composes the selected LU, in the second embodiment, a comparison is made with the load threshold 123 exhibited by the storage medium 121 that composes the selected LU from the threshold information table 120.

(3) Third Embodiment

The third embodiment differs in that, unlike the first embodiment, it is of a system configuration like a PC or a server instead of a large external storage device. Specifically, it differs in that storage devices comprise the same interface as a conventional HDD or an interface adapted to the internal bus of a host computer such as PCI, and in that the storage devices are directly connected to a chipset of the host computer.

<Storage System Configuration>

Figure 13:
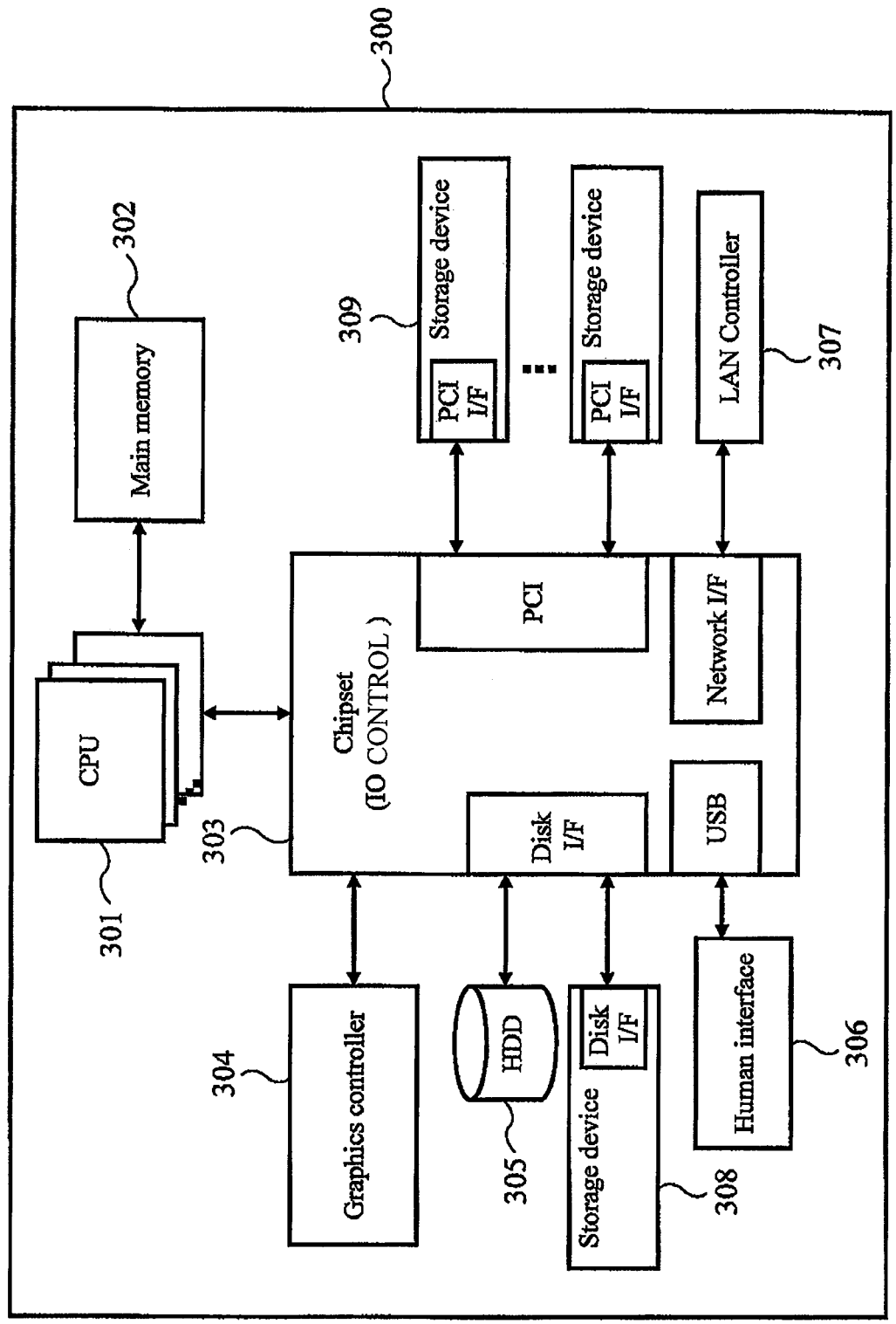
FIG. 13 is a block diagram showing a configuration example of a host computer according to the third embodiment of the present invention.

FIG. 13 is a block diagram showing an example of a storage system according to the third embodiment which comprises a host computer 300.

The host computer 300 comprises: a CPU 301 that controls the host computer 300; a main memory 302 in which data for controlling and such programs as an OS are stored; a chipset 303 that connects internal parts that compose the host computer 300; a graphics controller 304 that performs graphics control; an HDD 305 that stores data; a human interface device 306 that controls the input/output by a mouse, keyboard, display, and the like; a LAN controller 307 for controlling network connection; a storage device 308 that has a disk interface such as ATA or SAS; and storage devices 309 that have a PCI interface.

The chipset 303 is equipped with ports and connectors for realizing various interface connections such as, for example, a PCI interface, a USB interface, a network interface, and the like.

The storage device 308 may be the same as the storage device 100 in the first embodiment, or it may also be the same as the storage device 100 in the second embodiment. Further, with the exception that they have a PCI interface, the storage devices 309 may be the same as the storage device 100 in the first embodiment, or they may also be the same as the storage device 100 in the second embodiment.

In the third embodiment, for example, the main memory 302 may have the management information that is necessary for the formatting process. In addition, for example, the CPU 301 may execute the formatting process.

<Formatting Process>

The quick formatting process in the third embodiment is the same as the process in the first embodiment. On the other hand, the sequential formatting process in the third embodiment would be the same as the sequential formatting process in the first embodiment if there is only one type of storage media in the storage device 300, while it would be the same as the sequential formatting process in the second embodiment if there are several types of storage media in the storage device 300.

(4) Conclusion

Quick formatting, which is a technique that makes a storage volume of a storage device appear, to the host computer, to be formatted even though it is unformatted, executes, when an access request with respect to an unformatted storage area is issued, a process addressing the access request after format data has been written in that storage area. For this reason, with quick formatting, besides a process addressing an access request from a host computer, such I/O penalties as creating and writing format data are incurred. When a normal sequential formatting process is executed with respect to a storage volume which frequently incurs I/O penalties, the storage media that compose the storage volume become a performance bottleneck, and there is a risk that the time taken to process an access request from a host computer may become prolonged.

As such, in the present invention, a storage device comprises a bitmap for identifying whether or not a predetermined area in an LU is already formatted, and quick formatting and sequential formatting are run concurrently with respect to the LU. In so doing, the storage device measures the load exerted from the host computer per storage medium that composes the LU (it need not be per medium, and may instead be, for example, per reference unit, namely, in units of bits or bytes, that would allow for loads to be compared with a uniform standard across LUs), and divides LUs into a group of LUs for which the load per storage medium is low (high-priority group) and a group of LUs for which the load is high (low-priority group). Further, the storage device calculates the density, per unit LU capacity, of I/O penalties incurred in a storage volume undergoing quick formatting. The storage device then executes, with priority, sequential formatting with respect to the LUs belonging to the high-priority group and in order of descending density of incurred I/O penalties. It is thus possible to minimize the total amount of incurred I/O penalties. Further, by decreasing the total amount of incurred I/O penalties, it is possible to format storage volumes without prolonging the time taken to process access requests from a host computer. In other words, it is possible to execute, with priority, sequential formatting with respect to LUs for which storage media do not become a performance bottleneck even if sequential formatting is executed and in order of descending I/O penalty density. By thus prioritizing, in executing sequential formatting, LUs for which storage media do not become a performance bottleneck, it is possible to avoid prolongation of the time taken to process access requests from the host computer 10. Further, by executing sequential formatting with respect to LUs in order of descending I/O penalty density, it is possible to execute sequential formatting in such an order that further suppresses the total amount of incurred I/O penalties, and it is possible to format LUs without prolonging the time taken to process access requests from the host computer 10.

It is noted that it is possible to shorten, from what is normal, the processing time for access requests from a host computer by either executing, with priority, the sequential formatting process with respect to LUs belonging to the high-priority group or executing the sequential formatting process with respect to LUs in order of descending I/O penalty density, instead of executing both. However, by combining the two, it is possible to further shorten processing time, and one may expect synergistic effects.

The present invention may also be realized by means of a program code of software that realizes the functions of the embodiments. In this case, a storage medium on which a program code is recorded is supplied to a system or a device, and a computer (or a CPU or MPU) of that system or device reads the program code stored on the storage medium. In this case, as the program code itself that is read from the storage medium realizes the functions of the embodiments described above, the program code itself, as well as the storage medium that stores it, would constitute the present invention. Examples of such storage media for supplying program codes include flexible disks, CD-ROMs, DVD-ROMs, hard disks, optical disks, magneto-optical disks, CD-Rs, magnetic tapes, non-volatile memory cards, ROMs, and the like.

Based on instructions of the program code, an OS (Operating System) running on the computer and the like may perform part or all of the actual processes, and the functions of the embodiments described above may be realized through those processes. Further, after the program code read from the storage medium is written in the memory on the computer, a CPU of the computer and the like may perform part or all of the actual processes based on instructions of that program code, and the functions of the embodiments described above may be realized through those processes.

A program code of software that realizes the functions of the embodiments may be distributed via a network and stored on a storage means, such as a hard disk, memory, or the like of the system or the device, or on such a storage medium as a CD-RW, CD-R, or the like. Upon use, a computer (or a CPU or MPU) of that system or device may read and execute the program code stored on the storage means or the storage medium.

REFERENCE SIGNS LIST

10: Host computer
100: Storage device
101: Controller
102: Host interface port
103: Processor
104: Main memory
105: Cache memory
106: Management port
107: HDD
108: Management information table
109: Differential bitmap table
110: Internal network
111: SAS HDD
112: SATA HDD
113: SSD (SLC)
114: SSD (MLC)
120: Threshold information table
121: Storage medium
122: Limit performance
123: Load threshold
130: High-priority group
131: Logical unit number
132: Average load
133: LU capacity
134: Incurred I/O penalty amount
135: I/O penalty density
136: Formatting order
140: Low-priority group
150: Formatting situation management table
151: Status
152: Progress
155: Simultaneous execution number table
156: Limit execution number
157: Executable number
160: Formatting policy selection screen
161: Formatting policy selection list
162: Formatting start button
170: Formatting progress screen
171: Formatting situation table
172: Logical unit number
173: Formatting status
174: Formatting abort button
300: Host computer
301: CPU
302: Main memory
303: chipset
304: Graphics controller
305: HDD
306: Human interface device
307: LAN controller
308: Storage device
309: Storage device

The invention claimed is:
1. A storage device comprising:
a processor;
a main memory; and a plurality of memory devices that compose a plurality of storage volumes, where the memory devices are composed of a plurality of hard disk drive (HDD) units, wherein the processor, the main memory, and the HDDS are connected via an internal network, wherein:

the main memory manages, with respect to each of the plural storage volumes having an unformatted area, a load per HDD unit that composes each of the storage volumes, and the processor determines, in accordance with a value of the load per HDD unit of the storage volumes, an order of priority for a sequential formatting process of the plural storage volumes, and executes the sequential formatting process with respect to an unformatted area of the plural storage volumes in accordance with the order of priority, the main memory further manages:

a load threshold derived from an executable sequential formatting speed per HDD unit and a limit performance per HDD unit;

with respect to each of the plural storage volumes having the unformatted area, an I/O penalty density indicating a frequency of incurred I/O penalties per unit of storage volume capacity; and map information indicating whether or not an area is already formatted; and the processor compares the load threshold and the loads of the storage volumes, divides the storage columns into a high-priority group and a low-priority group, executes the sequential formatting process with respect to the storage volumes belonging to the high-priority group in order of descending I/O penalty density, and then executes the sequential process with respect to the storage volumes belonging to the low-priority group in order of descending I/O penalty density; and the processor references the map information and determines whether or not an area corresponding to an access request from a host computer is an area that is already formatted, and, if the area is an unformatted area, executes a quick formatting process with respect to the unformatted area.

2. The storage device according to claim 1, wherein the processor transmits progress information regarding the sequential formatting process to a host computer and/or a management computer.

3. A control method for a storage system having a host computer, a management computer, and a storage device, where the storage device has a processor, a main memory, and a plurality of memory devices that compose plural storage volumes, where the plurality of memory devices are composed of a plurality of hard disk drive (HDD) units, and the processor, the main memory and the plural HDDs are connected via an internal network, and the main memory manages with respect to each of the storage volumes having an unformatted area, an I/O penalty density indicating a frequency of incurred I/O penalties per unit of storage volume capacity, and the main memory manages:

with respect to each of the plural storage volumes having the unformatted area, a load per HDD unit that composes each of the storage volumes;

a load threshold derived from an executable sequential formatting speed per HDD unit and limit performance per HDD unit;

with respect to each of the plural storage columns having the unformatted area, I/O penalty density indicating the frequency of incurred I/O penalties per unit of storage volume capacity; and map information indicating whether or not an area is already formatted, the control method comprises the steps of;

determining an order of priority based on values of the I/O penalty density and executing a sequential formatting process with respect to the unformatted areas of the storage volumes in accordance with the order of priority, where the I/O penalty density is calculated by dividing an incurred I/O penalty amount per predetermined unit time by a capacity of the storage volume, and the incurred I/O penalty amount indicates, when there is an access request from the host computer for the unformatted area of the storage volumes, an amount of incurred processes other than processes that are necessary for processing the access request, referencing, when a access request from the host computer is received, the map information and determining whether or not an area corresponding to the access request is already formatted; and executing, if the area corresponding to the access request is an unformatted area, a quick formatting process with respect to the unformatted area, wherein in the sequential formatting process, the processor compares the load threshold and the loads of the storage volumes, divides the storage volumes into a high-priority group and a low-priority group executes the sequential formatting process with respect to the storage volumes belonging to the high-priority group in order of descending I/O penalty density, and then executes the sequential formatting process with respect to the plural storage volumes belonging to the low-priority group in order of descending I/O penalty density.

4. The control method according to claim 3, further comprising a step in which the management computer selects one policy from plural formatting policies in accordance with an instruction from a user, and transmits the selected formatting policy to the storage device, wherein in the step of executing the sequential formatting process, the processor of the storage device executes the sequential formatting process with respect to the unformatted areas of the storage volumes in accordance with the selected formatting policy.

5. The control method according to claim 3, further comprising the steps of:

transmitting progress information regarding the sequential formatting process to the host computer and/or the management computer; and receiving the progress information and displays the progress information on a display screen of a display device.

* * * * *